United States Patent [19]

Logan

[11] Patent Number: 5,231,380
[45] Date of Patent: Jul. 27, 1993

[54] INPUT KEYBOARD TOUCH-SENSITIVE ADJUNCT

[75] Inventor: James D. Logan, Windham, N.H.

[73] Assignee: MicroTouch Systems, Inc., Wilmington, Mass.

[21] Appl. No.: 731,281

[22] Filed: Jul. 16, 1991

Related U.S. Application Data

[63] Continuation of Ser. No. 391,440, Aug. 9, 1989, abandoned.

[51] Int. Cl.[5] ............................................. G09G 3/02
[52] U.S. Cl. .................................. 340/706; 340/711; 341/22
[58] Field of Search .............. 340/706, 709, 710, 711, 340/712; 341/22, 23, 31-34; 364/708; 310/313; 400/479; 248/917, 918, 920

[56] References Cited

U.S. PATENT DOCUMENTS

| | | | |
|---|---|---|---|
| 4,071,691 | 1/1978 | Pepper, Jr. | 178/18 |
| 4,078,257 | 3/1978 | Bagley | 341/23 |
| 4,129,747 | 12/1978 | Pepper, Jr. | 178/18 |
| 4,198,539 | 4/1980 | Pepper, Jr. | 178/18 |
| 4,293,734 | 10/1981 | Pepper, Jr. | 178/18 |
| 4,302,011 | 11/1981 | Pepper, Jr. | 178/19 |
| 4,312,228 | 1/1982 | Wohltjen | 310/313 |
| 4,371,746 | 2/1983 | Pepper, Jr. | 178/18 |
| 4,430,917 | 2/1984 | Pepper, Jr. | 178/18 |
| 4,439,757 | 3/1984 | Gross et al. | 341/23 |
| 4,488,146 | 12/1984 | Burchart | 340/711 |
| 4,543,571 | 9/1985 | Bilbrey | 340/709 |
| 4,550,221 | 10/1985 | Mabusth | 340/706 |
| 4,712,101 | 12/1987 | Culver | 340/710 |
| 4,736,191 | 4/1988 | Matzke et al. | 340/709 |
| 4,870,389 | 9/1989 | Ishiwata et al. | 340/706 |

Primary Examiner—Alvin E. Oberley
Assistant Examiner—Chanh Nguyen
Attorney, Agent, or Firm—Iandiorio & Dingman

[57] ABSTRACT

A method and apparatus to augment keyboard input to a computer: the apparatus including a sensor mounted on the keyboard which is responsive to physical contact by the user's hand and which emits signals corresponding to changes in pressure and position on the sensor. The apparatus also includes a controller card including an analog to digital converter to convert the position and pressure information into digital form for input into the computer. The sensor is located so that the user's thumb has access to the surface of the sensor without the need to move his or her fingers from the keyboard. A method of entering data into a computer includes sensing the pressure applied by the user's hand on a sensor, converting the sensor signal into digital form, and entering the digital information as an input to the computer.

21 Claims, 4 Drawing Sheets

INPUT KEYBOARD TOUCH-SENSITIVE ADJUNCT

This is a continuation of application Ser. No. 07/391,440, filed Aug. 9, 1989, now abandoned.

FIELD OF INVENTION

This device relates to user controlled input devices for computers, and more particularly to a touch-sensitive input device for use in conjunction with a standard computer keyboard.

BACKGROUND OF INVENTION

With the proliferation of computer software having expanded capabilities, the need for input devices beyond that of standard typewriter-style keyboards has blossomed. Most word processors, for example, control text with reference to cursor position. For this reason most keyboards are now equipped with not only the standard typewriter keys, but also with special direction arrow keys for controlling the position of the cursor. These special keys are typically located to the side of the standard typewriter key layout and require the user to move his or her hand to control the cursor. Other software products, such as graphics presentation software, allow the user to combine text and graphics and are adapted to accept graphics input through the use of alternative input devices such as a joystick or a mouse.

The use of these devices is inefficient, however, since the user must take his or her hand from the keyboard to operate the peripheral input device. Further, the user must incur the added expense and inconvenience of acquiring, maintaining and using an input device physically separated from the keyboard. Yet another disadvantage is that these peripheral devices command the use of extra desktop space. A joystick must be planted firmly on a tabletop to be used effectively or must be held with both hands. A mouse requires a substantial area of desk space on which to roll. Therefore the prior art devices are inefficient to use, cumbersome, demanding of space, and represent added expense to the user.

SUMMARY OF INVENTION

It is therefore an object of this invention to provide an input device which is inexpensive, easy to use, and requires a minimum of desk space to augment a computer keyboard.

It is a further object of this invention to provide such an input device which allows the user to generate information using his or her thumbs when the hands are in ordinary typing position on the keyboard.

It is a further object of this invention to provide such an input device which allows the user to enter information without diverting his or her fingers away from the keyboard.

It is a further object of this invention to provide such an input device which is responsive to the position and degree of pressure applied by the user's thumbs.

This invention results from the realization that a truly effective keyboard-augmenting input device may be accomplished by providing an input device which the user can use without displacing his or her fingers from the keyboard and which is responsive to the position and pressure applied to the device by the user.

This invention features an interface device for a computer for the entry of data and commands by a user, and includes sensing means adapted to receive and sense physical contact by the user's hand, and means responsive to the sensing means for generating digital information corresponding to the position and pressure of physical contact. The device also includes a connector port to connect the means for generating digital information to the computer so that the pressure and position information may be entered as input into the computer.

In a preferred embodiment, the means for generating digital information generates signals which emulate other input devices such as a mouse, a joystick, or direct arrows on a conventional keyboard. The device may be permanently attached to the keyboard of the computer or may be removably mounted to the keyboard. The device may include bistable switching devices, as well as simple pressure-sensitive sensors. Where the device is removably mounted on a keyboard, the mount may include a detachable, pivotal connection to allow the user to adjust the angle of the sensing means relative to the keyboard. The mounting means may include a support member having a front and a rear end, the front end supporting the sensing means and engaging the front edge of the keyboard, and the rear end of the support member may engage the rear edge of the keyboard. The mounting means may include an adjustable engaging member near the rear end of the support member for adjusting to the rear edge of various keyboards.

In one embodiment the sensing means includes a capacitive analog sensor. In alternative embodiments the sensing means may be a piezoelectric sensor, a surface acoustic wave sensor, or an optical sensor. The sensing means may include an analog ribbon controller. In another embodiment the input device may include an on-off switch for disconnecting the means for generating digital information from the computer to allow the user to avoid inadvertent entry of data into the computer. The surface of the sensor means may be adapted to provide a comfort-enhancing feel so that the user does not experience discomfort on repeated pressing or sliding the thumb on the surface. The sensing means may be enclosed in a frame and may be transparent. The frame may include a slot to allow the insertion of a template behind the sensing means to indicate positions corresponding to specified input commands. The input device may further include a steady state input switch for creating an ongoing signal without the need to maintain continuous pressure on the sensing means.

The invention may include means for receiving the output from the sensing means and for generating digital information or otherwise processing the output. The sensing means may include a flat resistive pressure-sensitive plate.

The invention also includes a method for entering input into a computer by sensing pressure applied by the user's thumb or hand on a sensing means adjacent to the keyboard, converting the pressure and location information of the user's touch into digital signals and entering the digital signals into the computer as input.

DISCLOSURE OF PREFERRED EMBODIMENT

Other objects, features and advantages will occur to those skilled in the art from the following description of a preferred embodiment and the accompanying drawings, in which.

Figure 1A:
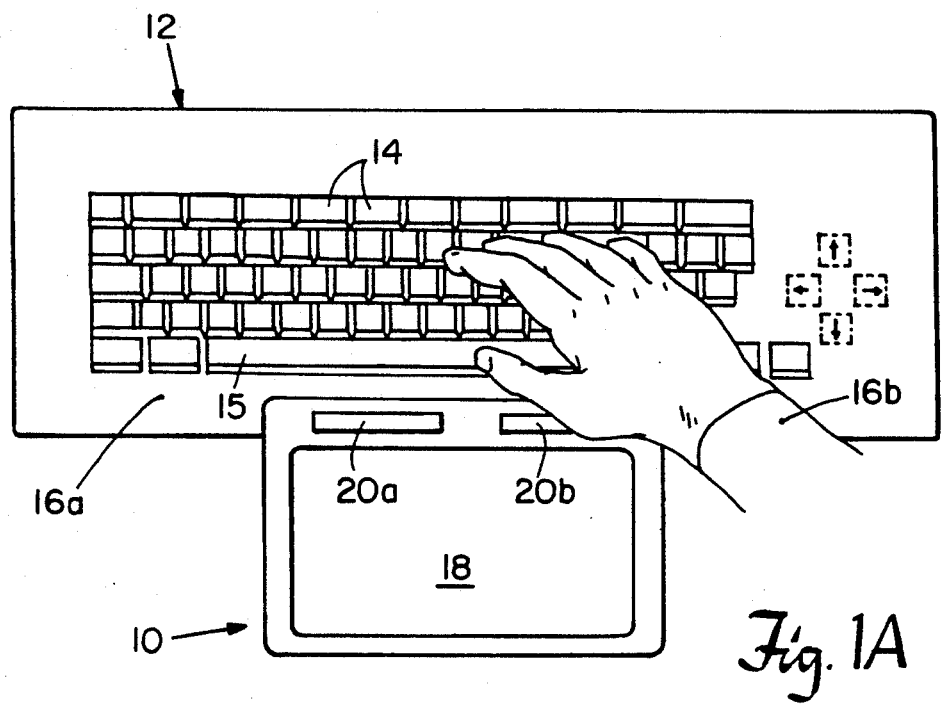
FIG. 1A is top plan view of a keyboard with an augmenting input device according to this invention.

There is shown in FIG. 1A an input device 10 according to this invention permanently installed on keyboard 12, which includes conventional keys 14. A user uses keyboard 12 in a conventional manner by placing his hands at the usual hand rest positions 16a, 16b. Input device 10 is placed just below the spacebar 15 to allow the user to reach sensor means 18 with the thumb without displacing the fingers from the keyboard. Input device 10 includes sensor means 18 for creating signals in response to pressure and location of the touch of the user's thumb or other parts of the hand. Sensor means 18 may be a piezoelectric device, an optical sensor, a capacitive sensor, resistive sensor, a ribbon controller, or other touch-sensitive device. Input device 10 may also include button-style switches 20a and 20b for switching various attributes of the input for example capitalization or underlining, to off or on conditions. Such switches are therefore responsive only to contact pressure and act to position of the pressure on the button.

The sensing devices may be continuous as described above, or the surface may be divided into regions acting as switches, or sensor means 18 may be include any combination thereof. The immediate output of sensor means 18 may contain analog or digital signals and may be organized in serial or parallel format. The immediate output of sensor means 18 may be transmitted directly to a keyboard decoding device, transmitted directly to a host device, or may be transmitted first to one or more intermediary processing devices such as an analog to digital converter, which may transform the output of sensor means 18 into some other form before sending the output to the computer keyboard decoding device, host device, or some other device. The intermediary processing device may also be adapted to transmit input from the conventional keys of the keyboard to the computer or other host device.

The surface of sensor means 18 may be glass or other similar material and may be coated with Teflon or some other low-friction substance to make sliding over the surface as easy as possible. Etched glass provides an adequately slippery surface while smooth glass does not. The choice of surface is dictated by the desire to minimize friction of the user's hand experienced by applying continuous pressure while moving the position of contact from one point to another on surface means 18 when, for example, controlling the position of a cursor displayed by the computer or "drawing" a line with graphics software. Arrow keys 17 (shown in phantom), often used for cursor control, are thus rendered obsolete, obviating the inefficiency of moving the hand from rest position 16b.

Figure 1B:
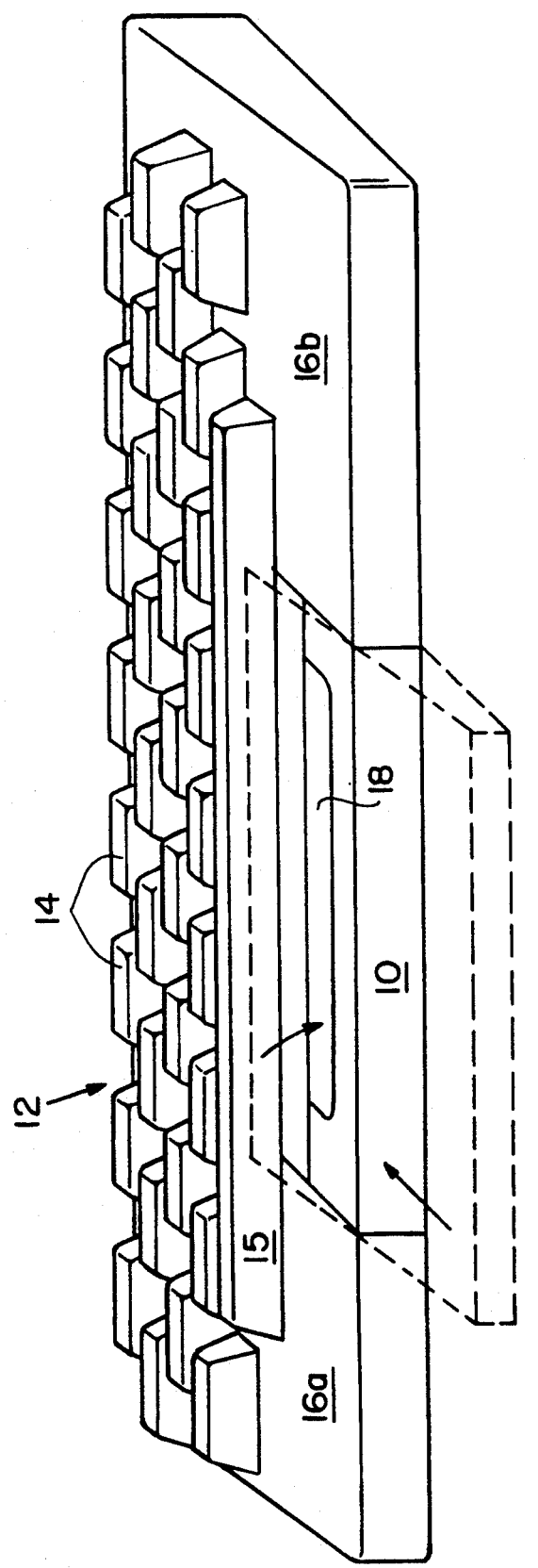
FIG. 1B is a front elevational view of the keyboard of FIG. 1A with the input device folded down and slid back into the keyboard according to this invention.

There are many instances where a cursor control button needs to be held down continuously while some other control button is simultaneously actuated. To avoid the need to use two hands at once for a single pressure controlled operation, input device 10 may include button-style switches 20 which create constant signals to allow the user to use a single hand with the second control key. Input device 10 may be fixably attached to keyboard 12 or may be pivotably and slid-ably attached so that, as shown in FIG. 1B, it may be recessed and slid out of the way beneath keyboard 12 when not needed.

Figure 2:
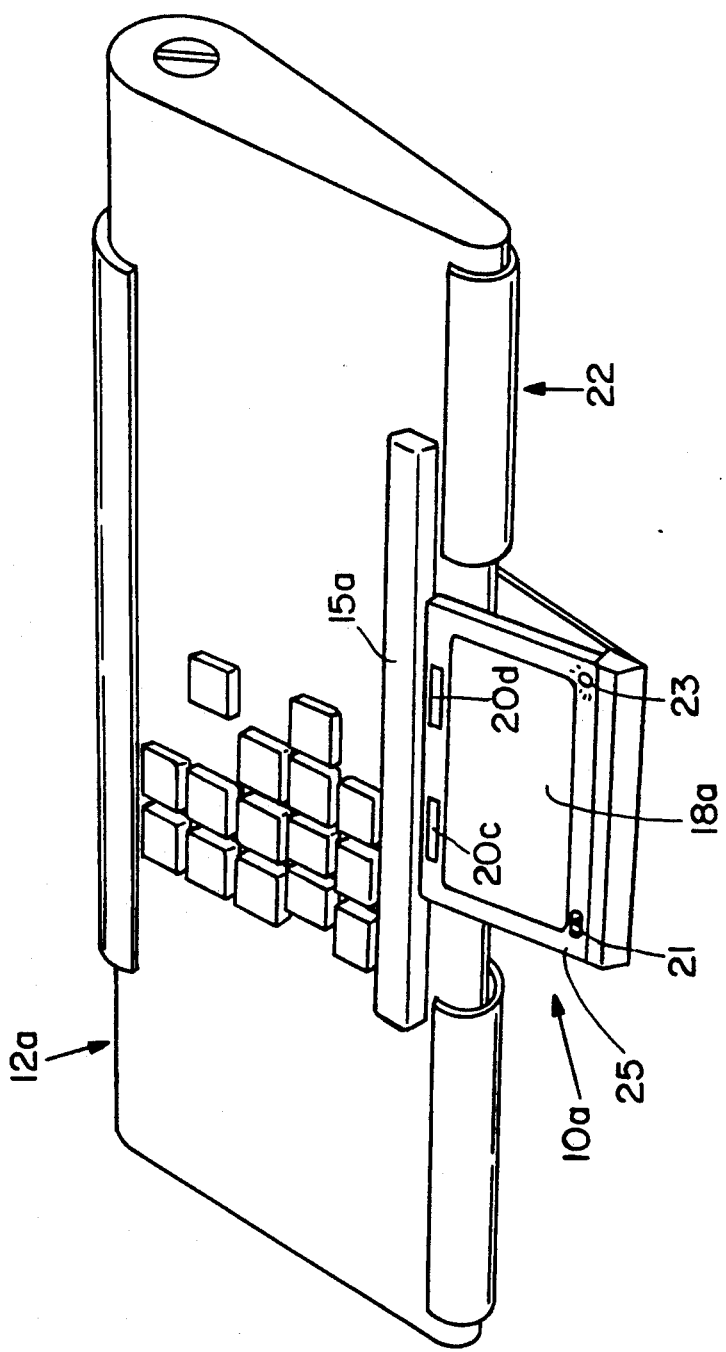
FIG. 2 is an axonometric view of a keyboard on which the augmenting input device according to this invention has been mounted.

There is shown in FIG. 2 input device 10a according to this invention which, in contrast to the input device shown in FIG. 1, is not an integral part of keyboard 12a. Input device 10a is attached to keyboard 12a by mounting means 22. Input device 10a includes on-off LED indicator 23 to remind the user when contact with sensor means 18a will result in input to the computer. The user may turn input device 10a off or on by use of on-off switch 21 and thereby prevents the inadvertent entry of data resulting from accidental contact with sensing means 18a. Sensor means 18a is held by frame 25, which provides some protection for and increases the rigidity of sensor means 18a. Input device 10a includes two long, low-profile buttons 20c, 20d, in frame 25. These keys have tactile feedback and require some positive pressure to activate them. Like a normal key on a keyboard, the thumb can rest on a button without activating it. On the side of the sensor opposite the cable termination, a similar button is built into the side of rim 25.

Figure 3:
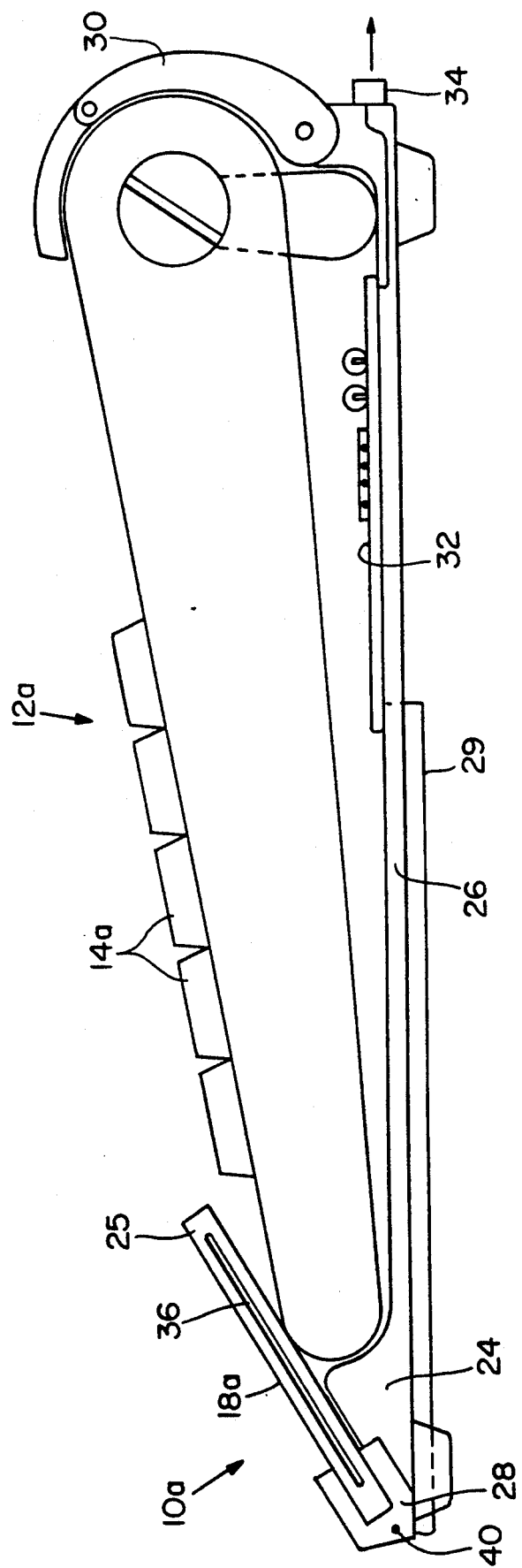
FIG. 3 is a side elevational view of the keyboard of FIG. 2.

FIG. 3 is a side view of the input device of FIG. 2. Frame 25 is shown including slot 36. Since sensor means 18a may be transparent, a template may be introduced into slot 36 behind sensor means 18a to indicate to the user areas on sensor means 18a which correspond to specified input data. Frame 25 is supported by removable and pivotable mount 28, which is mounted on front engagement means 24 of support member 26. Pivotal mount 28 is attached to front engagement means 24 by removable pivot pin 40 or by any similar means which would allow frame 25 and sensor means 18a to be pivoted into a comfortable position or to be removed from support means 26 for use as for example a "laptop" input device.

The signals generated by sensor means 18a are carried by signal cable 29 to analog to digital converter 32 or some other means for generating digital information which may also served as a "controller card" for input device 10a. Means of generating digital information may include analog to digital converters, PROM, a RAM, serial and parallel input/output ports, and may function by constantly monitoring the analog to digital converter channels and signal cable 29. It may then execute on-board software stored in the PROM to continuously determine the pressure and position indicated by sensor means 18a as could be known to those skilled in the art. The means for generating digital information 32 may also receive signals from keyboard 14 in the form of ASCII code or some other standard character information code, and may transmit this information directly to the host computer. Means for generating digital information 32 is connected to output connector port 34, which may be a standard connector port for connection to a mouse or joystick or other appropriate port on the computer. Support member 26 includes rear engagement means 30 which are pivotably connected to support member 26 so that a variety of sizes of keyboard 12 may be accommodated by support member 26.

Figure 4:
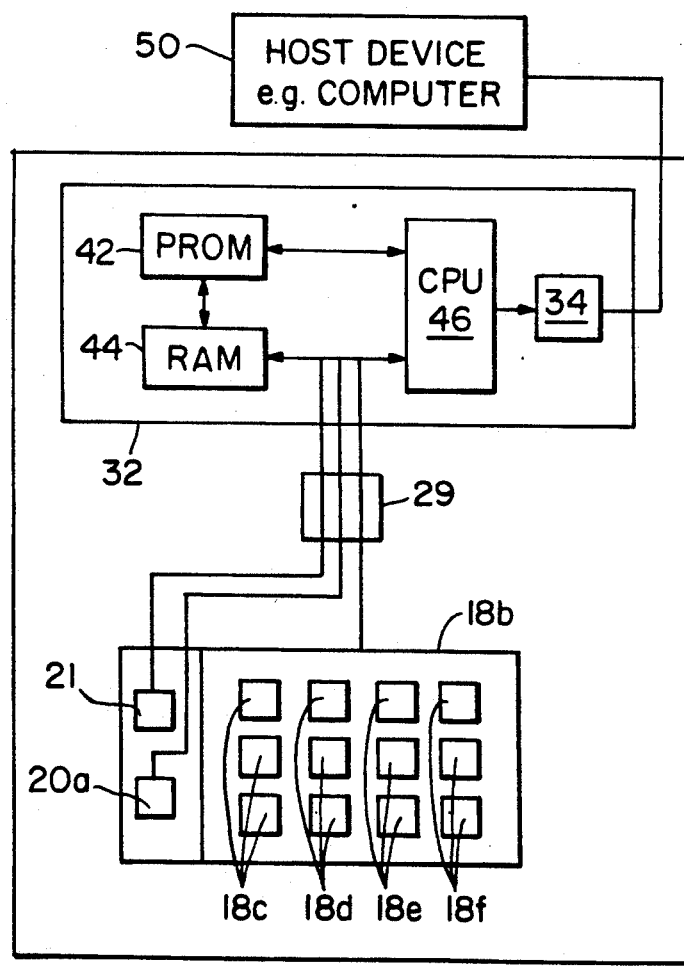
FIG. 4 is a schematicized view of the input device according to this invention.

FIG. 4 is a schematicized view of input device 10b according to this invention. Sensor 18b may include a variety of sensors 18c through 18f to provide position and pressure information resulting from contact by the user's hand or thumb. Sensors of this type are known to those skilled in the art. Button-style switch 20a may provide continuous data signals without the need for the user to continuously press the button and the entire device may be controlled by on-off switch 21. The signals produced by these switches is carried by the ends of signal cable 29 to analog to digital converter 32 which may include PROM 42 which includes instructions for the interpretation of signals carried by signal cable 29 and which acts as a controller card for input device 10b. Signals carried by signal cable 29 may be stored in RAM 44 and may be interpreted by CPU 46 according to the instructions contained in PROM 42. The appropriate output signals are produced by CPU 46 and sent to connector port 34, where they are introduced as input into host computer 50.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A touch sensitive input device for entry of data commands to a computer by user in conjunction with a keyboard having a spacer bar, comprising:

a flat touch sensor adapted to receive and sense physical contact by the user's hand;

a sensor mounting device having a front and a rear end, said front end engaging the front edge of the keyboard and said rear end engaging the rear edge of the keyboard, said mounting device including a removable sensor mounting frame pivotally attached to its front end surrounding and supporting said sensor for removably mounting said sensor below but adjacent the keyboard spacer bar at an adjustable angle to the keyboard, extending outward from the keyboard such that the user may contact said sensing means with his thumb or palm without removing his hands from the keyboard, said mounting device further including a rear keyboard engagement means pivotably attached to the sensor mounting device rear end for engaging the rear edge of the keyboard to firmly hold said sensor mounting device to the keyboard;

means, responsive to said sensor, for generating an output corresponding to the position and pressure of the physical contact of the user on said sensor; and means for passing said output to the computer.

2. The input device of claim 1 in which said means for generating an output generates signals which emulate a mouse.

3. The input device of claim 1 wherein said sensing means includes a capacitive analog sensor.

4. The input device of claim 1 wherein said sensing means includes a piezoelectric sensor.

5. The input device of claim 1 wherein said sensing means includes a surface acoustic wave sensor.

6. The input device of claim 1 wherein said sensing means includes an optical sensor.

7. The input device of claim 1 including an on/off switch for disconnecting said means responsive to said sensing means for generating an output from the computer to allow the user to avoid inadvertent entry of data into the computer.

8. The input device of claim 1 wherein said sensor is detachable from said sensor mounting frame.

9. The input device of claim 1 wherein said sensing means includes a surface adapted to allow comfortable sliding contact by the user's hand.

10. The input device of claim 1 wherein said sensor is transparent and said frame includes a slot to allow the insertion of a template behind said sensor.

11. The input device of claim 1 further including a steady state input switch for creating an ongoing signal without the need to maintain continuous pressure on the switch and in which said means for generating is further responsive to said steady state input switch for generating an output representing said ongoing signal.

12. The input device of claim 1 wherein said means for generating an output generates signals which emulate a joystick.

13. The input device of claim 1 in which said computer is coupled to a display means, having a particular shape, and in which said sensing means comprises at least one area which is substantially similar in shape to said display means, such that a correspondence exists between every point on said display means and a corresponding point, located in the same relative position, on said sensing means.

14. The input device on claim 13 in which said means for mounting includes a frame to hold said sensing means, said sensing means are transparent and said frame includes a slot to allow the insertion of a template behind said sensing means.

15. The input device of claim 14 wherein said one are is defined by said template.

16. The device of claim 14 in which said template is divided into a plurality of functional areas, each depicting a particular function or operation or input choice, said functional areas each being disposed below a coextensive area of said surface of said sensing means.

17. The input device of claim 16 wherein an input to one of coextensive areas disposed above one of said functional areas of said sensing device will cause said means for generating an output to generate an output which represents the depicted function, operation or input choice.

18. The input device of claim 13 wherein said sensing means effectively comprises a plurality of sensing devices continuously distributed through said sensing means.

19. The input device of claim 13 wherein said correspondence exists between at least one of said sensing devices and at least one of said every point on said display means.

20. The input device of claim 19 wherein said correspondence is virtual, being created by said means for generating an output.

21. The input device of claim 19 wherein said means for generating an output will generate a continuous output in response to a continuous input.

* * * * *